United States Patent Office

3,795,663
Patented Mar. 5, 1974

3,795,663
RECOVERY OF BACITRACIN
Guido Max Miescher, Terre Haute, Ind., assignor to Commercial Solvents Corporation
No Drawing. Filed May 1, 1972, Ser. No. 248,872
Int. Cl. C07c *103/52;* C07g *7/00;* C08h *1/00*
U.S. Cl. 260—112.5                          1 Claim

ABSTRACT OF THE DISCLOSURE

An improved process for the recovery of bacitracin from a fermented beer containing it by the steps of extracting the bacitracin with n-butanol, extracting the bacitracin with 10% water and sufficient phosphoric acid to pH 2, separating the water layer containing the bacitracin, adding sufficient calcium hydroxide to pH 6.5 thereby precipitating calcium phosphate, filtering same, concentrating the filtrate by evaporation and recovering the bacitracin therefrom.

BACKGROUND OF THE INVENTION

This invention relates to recovery of bacitracin. In a particular aspect, this invention relates to an improved process for the recovery of bacitracin from a fermented beer containing it.

Bacitracin is a valuable antibiotic for topical use in the practice of medicine or as a growth promoter in animal feed supplements. The zinc salt of bacitracin is especially valuable in these uses because it is exceptionally stable over long periods of time.

It is known from Senkus et al., U.S. Pat. 2,609,324 to recover bacitracin from a filtered, fermented beer containing it by extracting with butanol, extracting the bacitracin from butanol with an aqueous solution of phosphoric acid at pH 2.0, followed by a second extraction with butanol to free the bacitracin from phosphoric acid. Water was added and the butanol was then evaporated, leaving the bacitracin in aqueous solution from which it could be easily recovered, e.g. by freeze drying.

This process was subsequently modified to adjust the pH by treatment of the aqueous acid extract to eliminate impurities and improve the color, and the second butanol extract was also subjected to treatment designed to improve the yield. After evaporating the butanol, the bacitracin was precipitated from the aqueous solution by mixing with a solution of a zinc salt as disclosed by Zinn et al. U.S. Pat. 2,834,711. The precipitate was then separated and dried. Alternatively, it is known to recover the bacitracin by dehydrating the aqueous bacitracin solution by the process known as freeze-drying.

The process as outlined above has been very satisfactory for the production of pharmaceutical grade zinc bacitracin, but the plurality of steps involved results in high labor costs and there is a continual possibility of mechanical losses of product.

Accordingly, there has been a long-existent need for an improved process for recovery of bacitracin from a fermented beer containing it.

SUMMARY OF THE INVENTION

It is an object of this invention to provide a process for the recovery of bacitracin from a fermented beer.

It is another object of this invention to provide an improved process for the recovery of zinc bacitracin.

It is yet another object of this invention to provide a process for the recovery of bacitracin improved with respect to possible mechanical losses.

It is still yet another object of this invention to provide a simplified process for the recovery of bacitracin.

Other objects will be obvious to those skilled in the art from the disclosure herein.

According to the previous process a fermented beer containing bacitracin is adjusted to pH 3 with an acid, e.g. sulfuric acid, filtered, neutralized with sodium hydroxide to pH 7, extracted with n-butanol, which extract is then extracted with 10% water containing sufficient phosphoric acid to pH 2, and the water layer is then separated. These steps are also carried out in the present process in accordance with the prior art, i.e. the process of Senkus hereinbefore referred to. It is the discovery of the present invention to add to the aqueous, phosphoric acid extract sufficient calcium hydroxide to pH 6.5 resulting in precipitation of the phosphoric acid as calcium phosphate. The precipitate is separated and the remaining liquid is concentrated by evaporation to about 5000 units/ml. of bacitracin (sp. gr. 1.02). If additional precipitate develops, it is separated; then, for example, reverting to the previous process, a solution of a soluble zinc salt is added to precipitate the bacitracin or the bacitracin is recovered by other means, e.g. by evaporation and freeze-drying, as is known. If by the former method, the zinc bacitracin thereby formed is separated by any convenient means, dried and ground to specification size. Advantageously the discovery of this invention eliminates the steps of the second butanol extraction, treatment with charcoal, filtration and concentration by evaporation as practiced in the previous process. It is understood that it is not intended that the practice of this invention be limited to any particular method of recovering the bacitracin. The present invention can be used with any satisfactory method, many of which are known.

DETAILED DISCUSSION

The improvement steps of the present invention are applied to the previous process at the stage wherein the butanol extract containing the bacitracin has in turn been extracted with an aqueous solution of phosphoric acid having a pH of about 1.8 to 2.2. This solution is saturated with dissolved butanol and may even contain an appreciable amount of dispersed but undissolved butanol; usually there is also some sodium sulfate carried over from pH adjustments earlier in the process.

According to the present invention, this aqueous phosphoric acid solution of bacitracin is treated with incremental additions of a slurry of calcium oxide or, preferably, calcium hydroxide. Generally the slurry is prepared with from about 40–50 g., preferably about 45 g., of calcium oxide or hydroxide per 100 ml. of water. The slurry is kept well agitated to avoid lumps. This amount of slurry is sufficient to treat two liters of the bacitracin-phosphoric acid solution.

The calcium hydroxide or calcium oxide slurry is added slowly to the bacitracin-phosphoric acid solution with strong agitation. Since little of the calcium hydroxide is in solution the reaction with the phosphate ion is slow. Therefore, the pH should be monitored continuously. Calcium hydroxide is added until a pH of 4.3–4.5 is reached. Hereafter, the pH will slowly (within 30 min.) drift higher to about pH 6.5 or more. If the pH tends to drift above 6.5, small amounts of concentrated sulfuric acid are added to maintain the pH. Agitation and pH adjustment are continued until a stable pH 6.5 has been established. This may require an hour or longer.

A pH within the range of 6.0–7.0 generally gives good recoveries of bacitracin. However, at either limit, high ash contents result in the final product. Surprisingly, pH is critical for production of low ash product. Generally a pH of 6.4 to 6.6 gives good results, but a pH of 6.5 is particularly preferred as giving best results.

The calcium oxide or calcium hydroxide useful in the practice of this invention are commercially available. Generally a high quality comminuted grade is preferred to avoid introduction of undesirable impurities. Comminuted calcium carbonate can also be used on an equivalent weight basis, but the reaction time is slower. The calcium phosphate thereby obtained is much finer than with calcium hydroxide leading to difficulties in separation, and product losses across this step are higher.

The solids are now separated from the liquid phase by any suitable means, e.g. by centrifuging, or preferably by filtering. The calcium phosphate forms a coarse precipitate and it, along with calcium sulfate (if any) and excess calcium oxide or hydroxide, is relatively easy to filter. The filter cake is washed well with water and is preferably compressed to increase the effectiveness of the wash.

The undissolved butanol phase of the mixture at this point contains a high concentration of bacitracin. It is important therefore that in separating the excess calcium oxide or hydroxide, and the precipitated calcium phosphate and sulfate (if any) from the liquid phase, that undissolved butanol be processed also and not left as a residue. This can best be accomplished by maintaining good agitation during the separation step.

The liquid phase remaining after separation of solids is now concentrated to eliminate the butanol and to reduce the volume. Any suitable method of concentration can be used, but generally distillation of butanol (probably as the azeotrope) at reduced pressure is preferred. A temperature of about 25–35° is preferred at a pressure sufficient to provide distillation. The end of the butanol is marked by a rise in distillation temperature, as is known in the art. Generally the volume is reduced to about one-half the original by the distillation step.

Additional calcium phosphate may precipitate during the concentration step and if so it is separated by any suitable means, preferably by filtration. In the previous process, the concentrated solution obtained from a second butanol extraction (not employed in the improved process) was passed through an ion-exchange bed to separate sodium and chloride ions resulting from pH adjustments. This step is advantageously eliminated in the improvement of the present invention.

The bacitracin can now be recovered from the aqueous solution either by freeze-drying or by precipitation, e.g. as the zinc salt or other pharmacetically acceptable salt, preferably the zinc salt. Both methods are known in the art.

Usually the bacitracin will be recovered as the zinc complex in accordance as disclosed by Zinn et al. cited hereinabove. For each 10 grams of bacitracin, about 1.3 g. of zinc chloride, or an equivalent amount of any suitable, soluble zinc salt, many of which are known, is dissolved in water to form a concentrated solution. The zinc solution is then added to the bacitracin solution with stirring. The precipitate of zinc bacitracin thereby obtained is then separated by filtration or centrifugation, washed and dried, either by vacuum oven drying or by freeze drying.

The invention will be better understood with reference to the following examples. It is understood, however, that the examples are intended for illustration only and it is not intended that the invention be limited thereby.

EXAMPLE 1

Zinc bacitracin was recovered by the following steps.

(I) There was received from the fermentation unit a lot of fermented beer which had been acidified to pH 3 with sulfuric acid, filtered and neutralized with sodium hydroxide to pH 7. This filtered beer was then extracted with butanol in a Podbielniak counter-current extractor. The aqueous layer was discarded.

(II) To the butanol layer thereby obtained was added about 10% by volume of water and the pH was adjusted to about 2 with phosphoric acid, 85%, accompanied by good agitation. This mixture was allowed to stand until the butanol separated. It was then decanted. The water layer, saturated with butanol, was then treated according to the new process, step (III).

(III) A slurry of calcium hydroxide was prepared in a proportion of 45 g. calcium hydroxide per 100 ml. of water. This amount is sufficient to treat two liters of the water layer obtained above. This slurry was slowly added to the water layer with good agitation using pH monitoring equipment. When the pH reached 4.3–4.5, addition of calcium hydroxide was terminated, but agitation was continued. When the pH gradually rose to above 6.5, small amounts of concentrated sulfuric acid were added periodically to maintain a pH 6.5 until the pH stabilized. The mixture was then filtered, the filter cake compressed and then thoroughly washed with water.

Thes filtrate was delivered to a vacuum distillation unit and was distilled at 27° C. under reduced pressure until a temperature rise indicated all the butanol had been removed. The bacitracin was determined by bio-assay. The bacitracin was then precipitated and recovered as described below.

(IV) A solution of zinc chloride was prepared at a concentration of about 50 g. per 100 ml. of water. It was added with agitation to the bacitracin solution obtained above in a proportion of about 1.9 g. of zinc chloride per 1 million units of bacitracin. The precipitate thereby obtained was filtered, washed and freeze dried.

The results obtained by the foregoing procedures are given in the table.

EXAMPLES 2–5

The experiments of Example 1 were repeated in all essential details. The results are summarized in the table.

TABLE.—RECOVERY OF ZINC BACITRACIN

| Example number | 1 | 2 | 3 | 4 | 5 |
| --- | --- | --- | --- | --- | --- |
| Recovery efficiencies (percent): | | | | | |
| Start of III to start of IV | 97 | 79 | 100 | 79 | 91 |
| Start of III to final, dry zinc bacitracin | 77 | 75 | 85 | 72 | 77 |
| Potency of zinc bacitracin, units/mg | 67 | 59 | 61 | 71 | 70 |
| Zinc content (percent) | 6.3 | 5.1 | 4.7 | 5.3 | 5.6 |
| Moisture (percent) | 1.5 | 1.0 | [1] 7.5 | 1.1 | 1.1 |

[1] Not sufficiently dried.

EXAMPLE 6

The experiments of Example 1 is repeated in all essential details except that calcium oxide is substituted for calcium hydroxide. Good recovery of zinc bacitracin is obtained.

What is claimed is:

1. In a process for the recovery of bacitracin from a filtered fermented beer containing it by the steps of adjusting the pH to about 7, extracting said bacitracin with butanol, extracting said bacitracin from said butanol with aqueous phosphoric acid having a pH about 2, separating said bacitracin from said phosphoric acid, concentrating the filtrate to about 5000 units of bacitracin permilliliter, and recovering bacitracin therefrom, the improvement comprising recovering said bacitracin from said phosphoric acid by the steps of (a) adjusting the pH to about 6.5 with calcium oxide or calcium hydroxide thereby precipitating calcium phosphate, (b) separating the said calcium phosphate.

References Cited

UNITED STATES PATENTS 3,121,714   2/1964   Gollaher et al. _____ 260—112.5
2,834,711   5/1958   Zinn et al. _____ 260—112.5
2,609,324   9/1952   Senkus et al. _____ 260—112.5
2,763,590   9/1956   Gollaher et al. _____ 260—112.5

ELBERT L. ROBERTS, Primary Examiner

R. J. SUYAT, Assistant Examiner

U.S. Cl. X.R.

424—123

PO-1050
(5/69)

UNITED STATES PATENT OFFICE
CERTIFICATE OF CORRECTION

Patent No. 3,795,663            Dated March 5, 1974

Inventor(s) Guido M. Miescher

It is certified that error appears in the above-identified patent and that said Letters Patent are hereby corrected as shown below:

Column 4, line 13, "thes" should be --the--

Signed and sealed this 5th day of November 1974.

(SEAL)
Attest:

McCOY M. GIBSON JR.           C. MARSHALL DANN
Attesting Officer            Commissioner of Patents